Oct. 25, 1932.  H. E. BREY  1,883,874
TRACTION DRIVE MECHANISM FOR WORM DRIVE SHOVELS
Filed Oct. 10, 1928  4 Sheets-Sheet 4
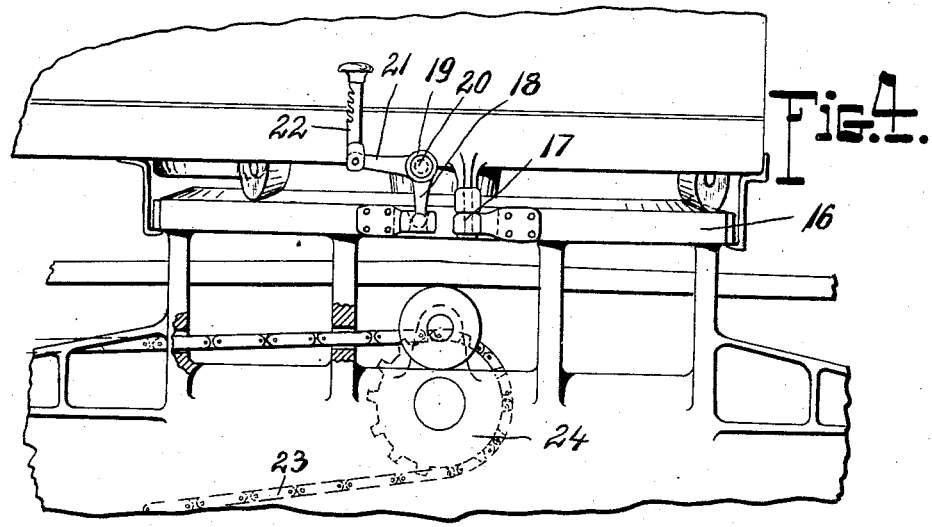
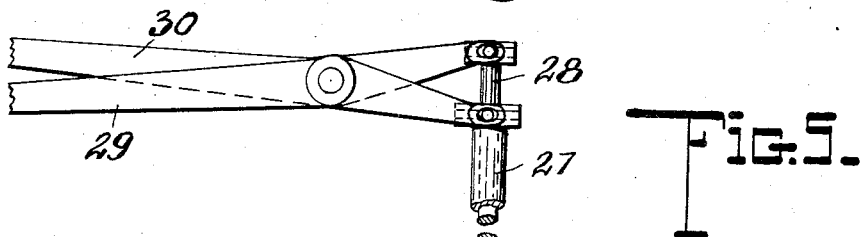
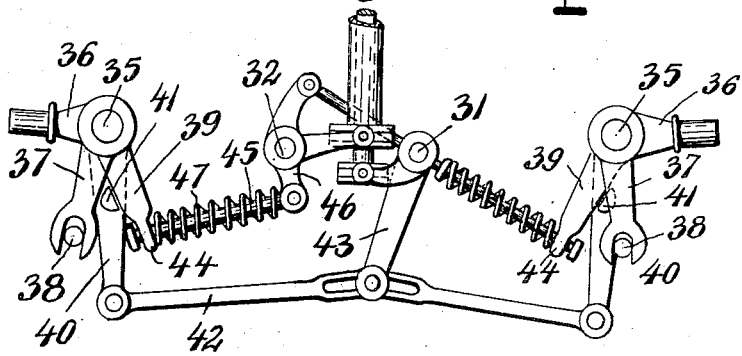
Inventor
Harold E. Brey
By Robb & Robb
Attorneys Patented Oct. 25, 1932

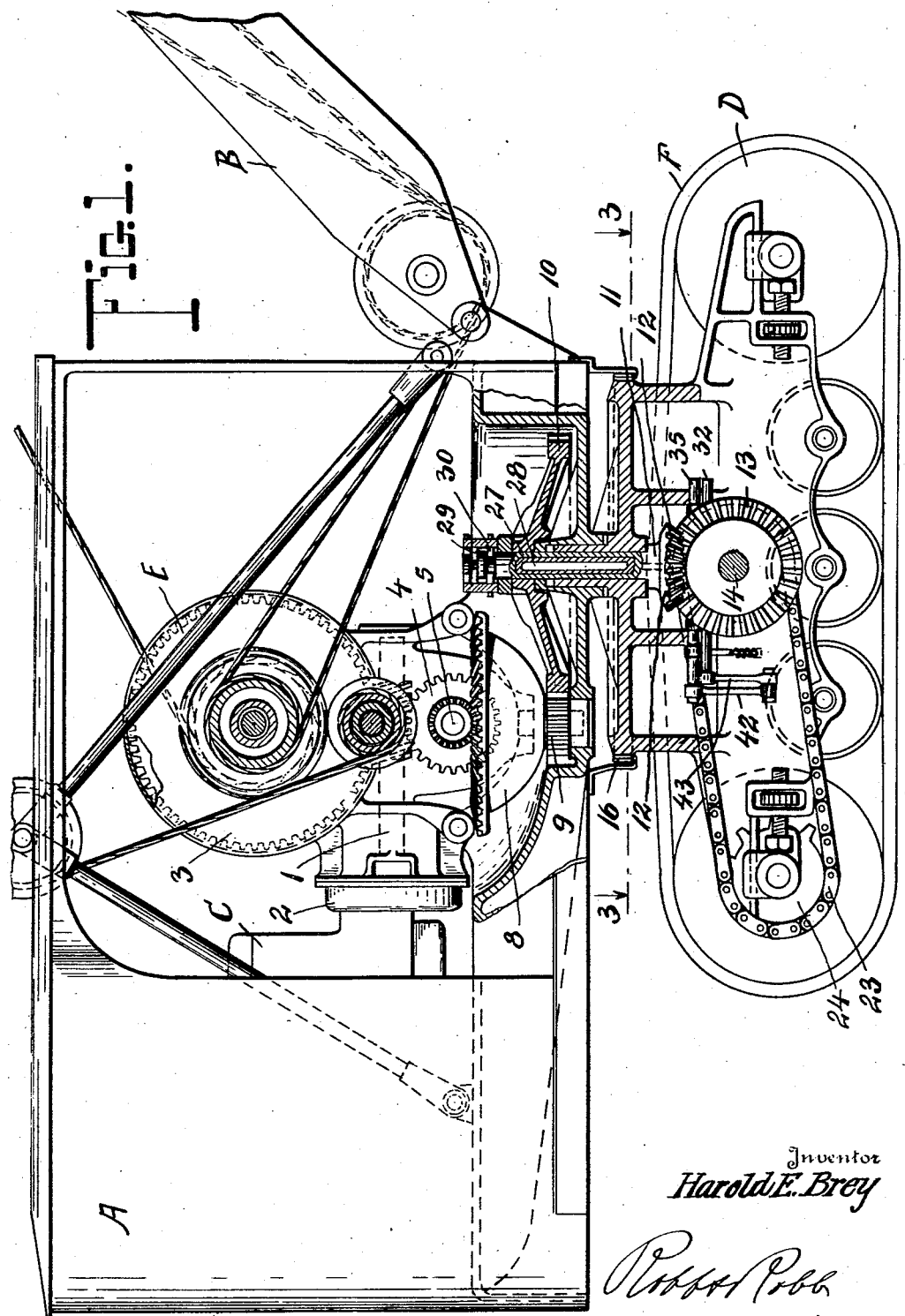

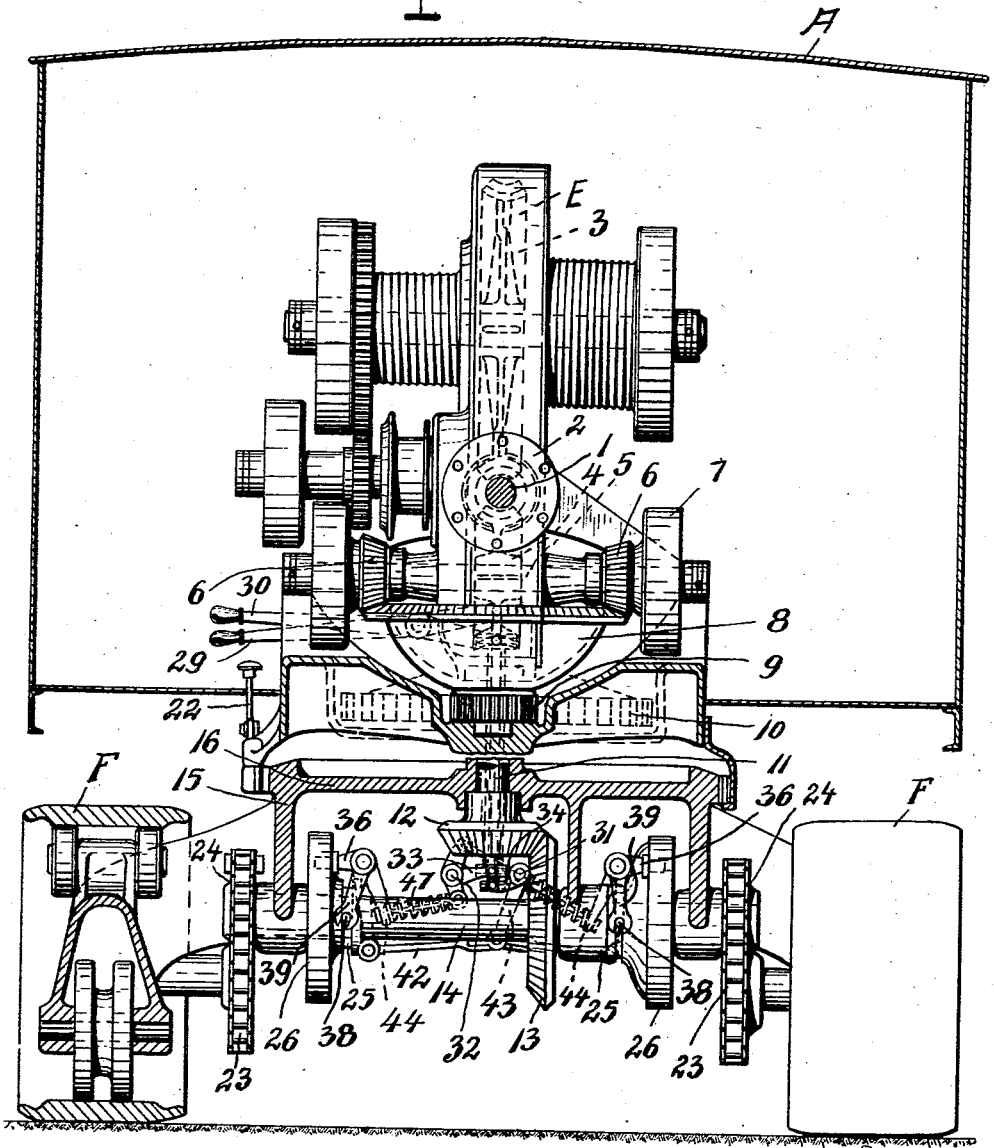

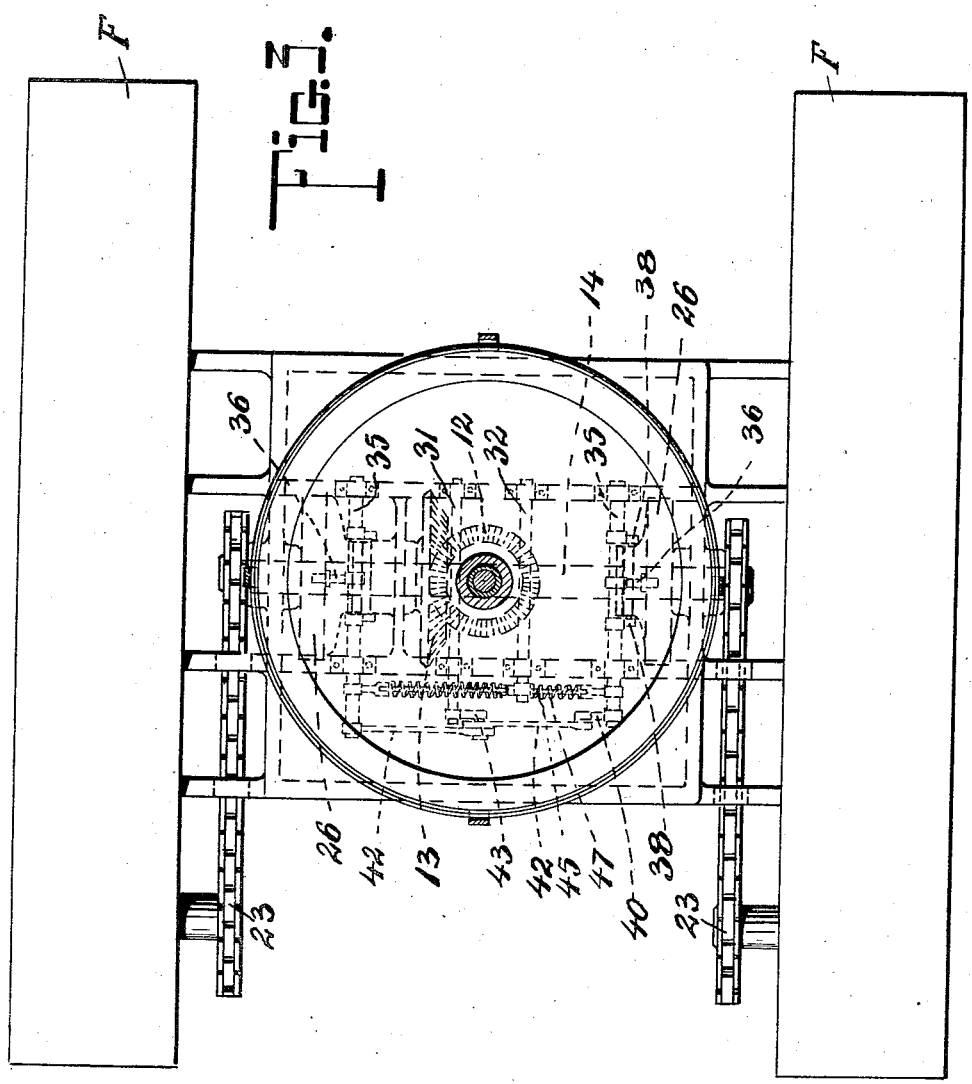

1,883,874

UNITED STATES PATENT OFFICE

HAROLD E. BREY, OF MILWAUKEE, WISCONSIN, ASSIGNOR TO KOEHRING COMPANY, OF MILWAUKEE, WISCONSIN, A CORPORATION

TRACTION DRIVE MECHANISM FOR WORM DRIVE SHOVELS

Application filed October 10, 1928. Serial No. 311,619.

This invention is directed to novel features and constructions of traction drive mechanism which is designed primarily for association and cooperation with the worm drive mechanism for excavators of the crane type, made the subject matter of the co-pending application of Lichtenberg, Serial No. 288,159, filed June 25th, 1928, now Patent No. 1,763,617, dated June 10, 1930. It will become apparent however, from the subsequent description, that the novel features are adapted for use with types of mechanism other than that of the co-pending application referred to.

Cranes of the portable and excavator type have several phases of operation which must be properly controlled in order that the excavator may function in the manner intended. This invention has particularly to do with the swinging operation between the crane body and the traction base and the operation of the traction devices included in the traction base. It is now universal practice in this art to avail of the traction devices as a steering medium which is accomplished by braking of the traction devices on one side of the base while driving the other, and vice versa, to provide turning actions. In order to properly control the operations of these traction devices, suitable clutch and brake instrumentalities are associated therewith, and one of the principal objects of this invention is to provide a single control lever for effecting steering operation on the part of the traction devices.

More specifically, when carrying out this idea, the lever is mounted on the crane body and so hooked up with the clutch and brake instrumentalities by suitable linkage, that movement of the lever in one direction causes turning of the crane one way, while a reverse operation of the lever causes steering in the reverse direction. This is accomplished through the linkage which sets a brake and releases a clutch associated with one traction device when the lever is moved in one direction, permitting the drive on the other traction device to drive the latter to turn the crane, while a similar action of the clutch and brake instrumentalities associated with the other traction devices affords a similar opposite turning operation when the lever is moved in a reverse direction.

Certain of the now known types of cranes indicate recognition of the fact that conditions never arise when it is essential to swing the crane body simultaneously with the operation of the traction device in order to simplify the mechanisms included in one of these types of excavators, which at best are very complex. This has resulted in an interlocking of the swing drive mechanisms with the traction drive transmission, or rather in the employment of a single driving mechanism for accomplishing both the swinging of the crane body on the base and the effective operation of the traction devices. This is accomplished by providing a locking means which may be brought into operation to lock the crane body against swinging whereupon the driving mechanism has a suitable base or ground for causing driving action of the traction devices. Conversely the latter may be locked by brake or like instrumentalities to provide a backing for imparting a swinging drive to the crane body. It is also essential in the operation of a crane to provide a brake for checking swinging action of the crane body so that it may be positioned so as to properly carry out digging and dumping actions.

In view of the foregoing conditions, an object aimed at is to provide a swing brake for the crane body which also constitutes a locking device for locking the crane body against swinging with respect to the traction devices so that the driving mechanism may be availed of to drive the traction devices. This end is attained by including a large brake drum in the construction of the traction base and surrounding the drum is provided a brake band carried by the crane body and operated therefrom. When the brake band is loose, swinging between the body and base is permitted, but immediately it is tightened by operation from the crane body, this swinging movement is inhibited in degree according to the degree of tightening. By firmly clamping the band around the drum the body is locked with respect to the base.

A highly important feature of the invention is the provision of braking instrumentalities associated with the traction devices which are employed to effect steering operations and which also may be availed of as a means for locking both the traction devices against movement so as to permit swinging drive of the crane body. More particularly, a second control lever is provided on the crane body and suitable linkage connects this control lever with the brakes of the traction devices so that they may be applied simultaneously incident to operation of the lever thereby locking the traction base against movement.

This feature of providing means for simultaneously applying the brakes that are availed of for steering operations is the achievement of another advantage which I propose to provide for by this invention, to wit, the provision of means whereby the steering brakes may be availed of as a means for holding the crane against digging operations.

Various other more detailed objects and advantages such as those surrounding the provision of proper connections between the control levers on the crane body and the brake and clutch instrumentalities on the traction base, will in part become apparent and in part be hereinafter stated as the description of the invention proceeds. For a full and more complete understanding thereof, reference may be had to the following description and accompanying drawings, in which—

Figure 1 is a view in side elevation of an excavator of the crane type made in accordance with this invention.

Figure 2 is a view from the front of a transverse section of the crane shown in Figure 1, parts being removed.

Figure 3 is a horizontal section, parts being removed, taken about on the line 3—3 of Figure 1.

Figure 4 is a detailed showing from the side, emphasizing in particular the swing brake and operating instrumentalities therefor.

Figure 5 is a detailed showing, somewhat diagrammatic, of the connections between the control levers on the crane body and the clutch and brake instrumentalities on the traction base.

While a preferred and specific embodiment of the invention is herein set forth, it is to be understood that I am not to be limited to the exact constructions illustrated and described, because various modifications of these details may be provided in putting the invention into practice within the purview of the appended claims.

Throughout the various figures of the drawings like reference characters denote corresponding parts.

Briefly describing the general crane construction with which the novel features provided by this invention are to be used, in Figure 1 a crane body is designated A and carries at the front end thereof a boom B pivotally mounted thereon. A suitable power source C is located in the rear of the body A and may take the form of an internal combustion engine. The crane body A is pivotally mounted on the traction base referred to generally as D, there being a center pin connection between these parts. Drum mechanism for taking up and paying out cables causing operation of the boom and excavator mechanism carried thereon, is indicated at E and is driven by the power source C through worm drive connections in a manner clearly developed in the copending application of Lichtenberg hereinbefore identified. It is not thought necessary to here go into a detailed description of this phase of the construction, because it is not material to this invention. However, we briefly note that a main worm drive shaft 1 is driven by the engine C and between which parts may be located the clutch mechanism shown at 2. This worm drive shaft 1 drives a large worm gear wheel 3 which in turn effects operating rotation of the drum mechanism E. It is noted that the worm gear 3 is located above the worm drive shaft 1, and positioned beneath the latter is a worm gear 4 of comparatively small diameter with respect to the gear 3 and is in engagement with the worm gear on the shaft 1 so that it is driven thereby.

Gear 4 is drivably mounted on a traction shaft 5 which also carries adjacent to each end, bevelled gears 6 which are freely mounted thereon. Clutch mechanisms 7 are associated with each of the bevel gears 6 so that either may be clutched to the shaft 5 as the occasion demands. Bevel gears 6 are in engagement with a large complemental cup gear 8 so that rotation of the former imparts corresponding motion to the latter. Attention is here called to the fact that the shaft 5 will be constantly driven in one direction, but that rotation in reverse directions on the part of the cup gear 8 is afforded by clutching either of the bevel gears 6 to the shaft 5 as need be. A pinion 9 which so far as effective operation is concerned, is integral with the cup gear 8, engages a large umbrella gear 10 which is drivably connected with the center pin of the construction indicated at 11. The center pin carries at its lower end a bevel gear 12 which meshes with a complemental bevel gear 13 carried by transverse shaft 14 of the traction base.

The traction base also includes a horizontally disposed drum 15 around which is positioned a brake band 16 carried by the crane body A. Attention is now drawn to Figure 4 from which it will be noted that one end of the brake band 16 is made fast at 17 to a projection depending from the crane body while the other end of the band, which constitutes the live end, is affixed to one arm 18 of a bell crank 19 which is pivotally mounted at 20 on the crane body. Associated with the other arm 21 of the bell crank is an operating member in the form of a foot pedal 22 which may be depressed to tighten the brake, thereby either checking swinging movement of the crane body or positively locking the latter with respect to the traction base against driving action on the part of the traction devices. The traction devices F are carried by the traction base and drivably connected by sprocket chains 23 with gears 24 which are adapted to be clutched to shaft 14 by clutch devices indicated at 25. Braking instrumentalities are shown at 26 which are effective to lock the traction devices F, through gear 24 and sprocket 23, against movement.

Briefly summing up the operation of the mechanism so far described, it will be noted that when the braking instrumentalities 26 are applied, the engine 3 drives the pinion 9 through the worm drive shaft 1, worm gear 4, shaft 5, gear 6, and cup gear 8, to cause swinging action on the part of the crane body, the gear 10 being held immovable by the connections between it and the lock traction devices in the form of the center pin 11, gears 12 and 13, shaft 14, etc. With the brakes 26 in the traction base released and the swing brake 16 locked, power is transmitted to the instrumentalities above noted to cause effective operation of the traction devices F. Passing on now to control instrumentalities for the clutches 25 and brake instrumentalities 26, it is noted that center pin 11 is of hollow construction and extending therethrough is a tubular rod 27 within which is concentrically arranged a connecting link 28. Two manually operable levers 29 and 30 are pivotally mounted on the crane body, preferably coaxially, and have their ends connected with the shafts 27 and 28 in the following manner.— The lever 30 is operatively connected with the inner shaft 28 by a yoke and groove construction so as to allow for relative rotation between the crane body and traction base, while a similar connection is availed of in operatively linking up the lever 29 with the tubular rod 27. It will be apparent that the levers 30 and 29 may be raised or lowered to cause reverse actions on the part of their respective shafts 28 and 27. I now draw attention to Figure 3 and note that shafts 31 and 32 are included in the construction of the traction base and mounted in suitable bearings to permit of turning movement on their part. These shafts are located in comparatively close proximity to the center pin and extending therefrom are arms 33 and 34 which terminate in yokes engaging clutches in the lower ends of the tubular rod 28 and rod 27 so as to operatively connect these parts with the shafts 31 and 32. This connection is such that vertical movement of the rods 27 and 28, causes rocking of the shafts 32 and 31. The shaft 32 is connected with the tubular rod 27 while the shaft 31 is connected with the inner rod 28.

Properly positioned with respect to the clutch and brake instrumentalities at each side of the traction base, are shafts 35 having suitable bearing in the traction frame to permit of their turning. The assemblage of the instrumentalities associated with each of the shafts 35 is identical on both sides of the machine, so only one of them will be here set out in detail.

An arm 36 which is one arm of a bell crank freely carried by the shaft 35, the other arm being indicated at 39, is connected with the braking instrumentalities 26 so that rotation of the bell crank comprising arms 36 and 39, in a counter-clockwise direction, will apply the brakes. Reference is now being made to the linkage shown at the left hand side of Figure 5. A yoke 37 is also carried by the shaft 35 and engages pins 38 extending from the clutching devices 25 so that rotation of the shaft 35 causes a shifting of the movable clutch element from which the pins project.

An arm 40 projects downwardly from the shaft 35 with which it is drivably connected, and carries a lock 41 which is adapted to engage the arm 39 of the bell crank. A link 42 is pivotally connected to the lower end of the arm 40 and at its other end has a loose joint in the form of a pin and slot connection with an arm 43 carried by the shaft 31. It will be apparent that the arm 43 is capable of imparting only a pull to the link 42, motion in the opposite direction being accommodated by the pin and slot connection without setting up any motion on the part of the link 42.

The arms 39 of the bell crank 36—39, terminate in a flattened portion 44 in which there is an aperture. Through this aperture extends a headed rod 45 which is pivotally connected at its other end with the extremity of one arm of a lever 46 carried by the shaft 32. A spring 47 surrounds the rod 45 and functions to maintain the arm 39 in abutting relation with respect to the lock 41. The lever 30 is the control lever designed to control steering operations on the part of the traction devices. It will be noted that when this lever is moved upwardly, the shaft 28 will be depressed, causing the rocking of the shaft 31 in a right-hand direction as shown in Figure 5. This causes a corresponding movement on the part of the arm 43 which applies a pull to the link 42 on the left-hand side but which imparts no movement to the link 42 on the right-hand side. This pull rightwardly on the rod 42 causes a turning of the arm 40 which rocks the shaft 35 to release the clutch through yoke 37, and because of the engagement of the lug 41 with the arm 39 of the bell crank 36—39, applies the brake thereby causing a release of the clutch and application of the brake on the left-hand side of the machine, while the traction device on the right hand side continues to be driven thereby causing steering action in the direction as desired. Should turning be desired in the opposite direction, the lever 30 will be depressed which causes upward motion of the rod 28 and a rocking of the shaft 31 in a left-hand direction. This imparts a pull on the link 42 on the right-hand side of Figure 5 and the clutch will be released and brake applied in identically the same manner as described in the operation of the mechanism on the left-hand side. When the occasion arises when it is desired to lock the traction devices so as to cause swinging action of the crane body, the lever 29 is depressed which causes an upward movement of the tubular rod 27, rocking the shaft 32 in a counter-clockwise direction, which movement, through the links 45, applies both of the brakes on each side of the machine simultaneously. The brakes are released by lifting the lever 30 as will be apparent.

Having thus described my invention, what I claim as new and desire to secure by Letters Patent of the United States, is

1. In crane mechanism of the class described, the combination with a crane body pivotally mounted on a traction base including traction devices, and driving mechanism including swing gearing for causing either swinging action of the crane body with respect to the base or effective operation of the traction devices for traveling, of brake instrumentalities and clutch devices associated with the traction devices and operable to cause steering operation on the part of the latter, the braking instrumentalities constituting a means for locking the traction devices during swinging action on the part of the crane body by operation of the swing gearing, and control levers, one for controlling steering action of the clutch devices and braking instrumentalities, and another for controlling simultaneous application of the braking instrumentalities to hold the traction means stationary and enable the swing gearing to effect swinging of the body on the base.

2. In crane mechanism of the class described, the combination with a crane body pivotally mounted on a traction base including traction devices, and driving mechanism including swing gearing for causing either swinging action of the crane body with respect to the base or effective operation of the traction devices for traveling, of brake instrumentalties and clutch devices associated with the traction devices and operable to cause steering operation on the part of the latter, the braking instrumentalities constituting a means for locking the traction devices during swinging action on the part of the crane body by operation of the swing gearing, and a pair of control levers located on the crane body, one of said levers controlling selective operation of the clutch devices and therefore the steering operation while the other effects simultaneous application of the brakes to lock the traction devices and to hold said traction means stationary and enable the swing gearing to effect swinging of the body on the base and operating means for the brakes in their operation as steering means.

3. In crane mechanism of the class described, in combination with a crane body, traction base including traction devices, a rotatable connection between the body and base and driving mechanism for causing either swinging action on the part of the crane body with respect to the base, or effective operation of the traction devices, of clutch devices and braking instrumentalities associated with the traction devices for causing steering actions on the part of the latter, said braking instrumentalities being applicable simultaneously and separately from the clutch devices to lock the traction devices and to hold them stationary to enable the swing gearing to effect swinging of the body on the base, and a single control lever on the crane body for controlling steering operation of the traction devices.

4. Crane control mechanism of the class described, comprising, in combination, a crane body pivotally mounted on a traction base, including traction devices, by a center pin connection, clutch devices and braking instrumentalities associated with the traction devices for controlling steering operations on the part of the latter, the braking instrumentalities also constituting means for locking the traction devices to cause swinging action of the crane body, control levers on the crane body, connections between one of said control levers and the braking instrumentalities and clutch devices associated with the center pin whereby operation of the control lever causes steering action on the part of the traction devices, and connections between another control lever and the braking instrumentalities also associated with the center pin, for simultaneously applying or releasing said braking instrumentalities.

5. Crane control mechanism of the class described, comprising, in combination, a crane body pivotally mounted on a traction base including traction devices, driving mechanism including swing gearing for causing either swinging action of the crane body with respect to the base or effective operation of the traction devices for traveling, clutch devices and brake instrumentalities on the base associated with the traction devices for controlling the operation of the latter to effect steering actions thereof, the braking instrumentalities constituting means for locking the traction devices to cause swinging action on the part of the crane body by operation of the swing gearing, a control lever on the crane body, connections associated with the pivotal connection between the crane body and the traction base connecting the control lever with both the clutch devices and the braking instrumentalities on the traction base, said connections between the control lever and the last named parts including yokes for shifting parts of the clutch devices, bell cranks for operating the brakes, said yokes and bell cranks being so arranged that operation of the latter causes operation of the former, a second control lever on the crane body, and connections between said last named lever and the braking instrumentalities whereby said lever is operable to simultaneously apply the braking instrumentalities without entailing operation of the clutch devices to hold the traction devices stationary and enable the swing gearing to effect swinging of the body on the base.

6. Crane control mechanism of the class described, comprising, in combination, a crane body pivotally mounted on a traction base including traction devices, driving mechanism including swing gearing for causing either swinging action of the crane body with respect to the base or effective operation of the traction devices for traveling, clutch devices and brake instrumentalities associated with the traction devices for controlling the operation of the latter to effect steering actions thereof, the braking instrumentalities constituting means for locking the traction devices during swinging action on the part of the crane body by operation of the swing gearing, a control lever on the crane body, connections associated with the pivotal connection between the crane body and the traction base connecting the control lever with both the clutch devices and the braking instrumentalities on the traction base, said connections between the control lever and the last named parts including yokes for shifting parts of the clutch devices, bell cranks for operating the brakes, said yokes and bell cranks being so arranged that operation of the latter causes operation of the former, and a brake control lever mounted on the crane body and having pivotal connection between the body and base with the bell cranks operating the braking instrumentalities, said bell cranks being operable independently of the clutch shifting yoke members to simultaneously apply both brakes to hold the traction devices stationary and enable the swing gearing to effect swinging of the body on the base.

7. In crane mechanism of the class described, the combination with a crane body, a traction base, and a rotative connection therebetween, of driving mechanism including swing gearing for causing either swinging of the crane body with respect to the base, or operation of the traction devices for traveling included in the traction base, a swing brake operable to both lock the crane body with respect to the traction base to provide a backing for driving action on the part of the traction devices and also operable as a swing brake for checking swinging movement of the crane body, a plurality of brakes for the traction base, clutches for the traction units, means for operating selectively the clutches together with the brakes, the actuation of clutch means simultaneously actuating brake means so that engagement of one clutch will release its brake while applying the other brake and disengaging its corresponding clutch, a clutch actuating member for controlling actuation of the clutches together with the brakes for steering actions, and means for simultaneously operating the said brakes independently of the clutches to hold the traction means stationary and to enable the swing gearing to effect swinging of the body on the base.

8. In crane mechanism of the class described, the combination with a crane body, a traction base, and a hollow pivotal connection therebetween, of driving mechanism including swing gearing for causing either swinging of the crane body with respect to the base or effective operation of the traction devices for traveling included in the traction base, a swing brake operable to both lock the crane body with respect to the traction base to provide a backing for the driving action on the part of the traction devices and also operable as a swing brake for checking swinging movement of the crane body, an actuating rod passing through the hollow pivotal connection, clutch levers actuated by the rod and located therebeneath, brake actuating means engaging the latter to cause predetermined corresponding actuation of the brakes with the clutches, an operating device connected with said actuating rod, a sleeve surrounding the clutch actuating rod and passing through the hollow pivotal connection, said sleeve being connected to the brake actuating means for simultaneous operation of the brakes independently of the clutch actuating means to hold the traction means stationary and to enable the swing gearing to effect swinging of the body on the base, and a brake actuating lever on the swing body connected with said sleeve.

9. In a crane mechanism of the class described, in combination, a traction base including a plurality of traction devices, a swing body mounted to rotate thereon, an engine, driving instrumentalities connected with the engine to drive the traction devices from the same, clutch and brake devices to control either of the traction devices to operate for steering action of the machine and both to control for forward travel the driving mechanism, a swing pinion on the body and a swing gear geared to the traction devices on the traction base operable to swing the body when the brakes are applied simultaneously and independent from the clutch devices to hold the traction devices stationary to thus hold the swing gear from rotating so the action of the swing pinion may enable it to turn the swing body by travel about the swing gear, the swing pinion driving the traction devices when the body is prevented from rotating on the base, a swing brake to check the swinging movement and to hold the body from rotating, so the traction devices may be driven by the swing pinion and gear, and a device to cause that actuation of the clutches performs actuation of the brakes as desirable for steering action.

10. In a crane mechanism of the class described, a traction base including a pair of traction devices, a swing body mounted on said traction devices and adapted to rotate thereon, an engine, driving instrumentalities connected with the engine to drive the traction devices from the same, clutch and brake devices to control either of the traction devices and adapted to be operated selectively or simultaneously for steering and propelling the machine, said braking instrumentalities constituting a means for locking or for partially locking the traction devices to cause the engine to apply its full power to rotate the swing body or to distribute its power between rotation of the swing body and propulsive movement of the machine, and a swing brake to check the rotational movement of the body or to partially check the same to permit the power derived from said engine to be distributed between rotational movement of the swing body and propulsive movement of the traction devices in proportion to the pressure applied by the swing brake.

In testimony whereof I affix my signature.

HAROLD E. BREY.